(12) United States Patent
Zhang et al.

(10) Patent No.: US 10,566,856 B2
(45) Date of Patent: Feb. 18, 2020

(54) AC PERMANENT MAGNET MOTOR

(71) Applicant: Xian Zhang, Jiangsu (CN)

(72) Inventors: Xian Zhang, Jiangsu (CN); Wenjie Zhang, Jiangsu (CN); Xiaoyan Zhu, Jiangsu (CN)

(73) Assignee: Xian Zhang, Nanjing, Jiangsu (CN)

( * ) Notice: Subject to any disclaimer, the term of this patent is extended or adjusted under 35 U.S.C. 154(b) by 11 days.

(21) Appl. No.: 15/909,283

(22) Filed: Mar. 1, 2018

(65) Prior Publication Data
US 2019/0207438 A1 Jul. 4, 2019

(30) Foreign Application Priority Data
Apr. 7, 2017 (CN) .......................... 2017 1 0234698

(51) Int. Cl.
| | |
|---|---|
| *H02K 1/17* | (2006.01) |
| *H02K 1/27* | (2006.01) |
| *H02K 17/12* | (2006.01) |
| *H02K 17/16* | (2006.01) |
| *H02K 17/26* | (2006.01) |
| *H02K 21/46* | (2006.01) |
| *H02K 53/00* | (2006.01) |

(52) U.S. Cl.
CPC ............ *H02K 1/17* (2013.01); *H02K 1/2706* (2013.01); *H02K 17/12* (2013.01); *H02K 17/165* (2013.01); *H02K 53/00* (2013.01); *H02K 17/26* (2013.01); *H02K 21/46* (2013.01)

(58) Field of Classification Search
CPC ........ H02K 1/17; H02K 1/2706; H02K 17/12; H02K 17/165; H02K 53/00; H02K 17/26; H02K 21/46; H02K 21/14; H02K 5/225; H02K 3/28; H02K 1/278; H02K 1/265; H02K 1/165
USPC .......................................... 310/125, 181, 216
See application file for complete search history.

(56) References Cited

U.S. PATENT DOCUMENTS

| | | | | | |
|---|---|---|---|---|---|
| 4,728,830 | A | * | 3/1988 | Gamble ................. | H02K 37/10 310/12.12 |
| 5,250,867 | A | * | 10/1993 | Gizaw .................... | H02K 21/16 310/156.12 |
| 5,578,880 | A | * | 11/1996 | Lyons ................. | F16C 32/0442 310/90.5 |
| 5,825,112 | A | * | 10/1998 | Lipo .................... | H02K 19/103 310/181 |

(Continued)

*Primary Examiner* — John K Kim
(74) *Attorney, Agent, or Firm* — Muncy, Geissler, Olds & Lowe, P.C.

(57) ABSTRACT

The present invention discloses an alternating current (AC) permanent magnet motor, including a stator, a rotor, and a controller. Cable troughs and some same coil windings exist on a silicon steel sheet of a stator core. Grooves exist on the stator core, and stator permanent magnets are mounted in the grooves. The groove includes two types of grooves, namely, open grooves and enclosed grooves, and the two types of grooves are alternately laminated to form the stator core. A coil unit of the stator includes stator permanent magnets mounted in grooves of two stator cores and four same coils, and some same coil units form a three-phase stator coil. The rotor includes rotor cores, enclosed squirrel cages and rotor permanent magnets. The controller outputs a three-phase power source having a same positive and negative half sine-wave or step-wave pulse.

6 Claims, 6 Drawing Sheets

(56) References Cited

U.S. PATENT DOCUMENTS

| | | | |
|---|---|---|---|
| 6,563,244 B1* | 5/2003 | Yamauchi | F16C 32/0459 310/154.02 |
| 7,868,506 B2* | 1/2011 | Hoang | C23C 4/04 310/154.11 |
| 8,508,095 B2* | 8/2013 | Husband | H02K 21/44 310/12.24 |
| 2007/0145851 A1* | 6/2007 | Kikuchi | F04C 29/0085 310/156.78 |
| 2009/0091198 A1* | 4/2009 | Husband | H02K 21/44 310/46 |
| 2014/0265990 A1* | 9/2014 | Chretien | H02P 21/16 318/558 |
| 2015/0123510 A1* | 5/2015 | Dajaku | H02K 29/03 310/216.106 |
| 2019/0207438 A1* | 7/2019 | Zhang | H02K 1/17 |

\* cited by examiner

AC PERMANENT MAGNET MOTOR

BACKGROUND

Technical Field

The present invention relates to the field of magnetic energy conversion technologies of rare earth permanent magnets, to a permanent magnet motor indirectly converting magnetic energy into mechanical energy, and specifically, to an alternating current (AC) permanent magnet motor.

Related Art

Currently, it is urgently needed to develop a device that indirectly converts magnetic energy of a super permanent magnet made of a rare earth neodymium-iron-boron alloy into mechanical energy. In a process of developing an entire system, new technical problems are constantly put forward. In the market, although compared with a conventional motor, a permanent magnet motor having a rotor made of a rare earth permanent magnet obviously saves more electricity, an exciting coil is still used on a stator. Consequently, electricity consumption of the stator is not reduced, and heat dissipation of the stator consumes much energy, which may often result in a safety accident that a winding is burnt out due to overheating. Therefore, an energy-saving solution needs to be further researched, to ensure that a machine set is safer. For the foregoing problem, researches may be first carried out on an existing permanent magnet motor. Key points are whether a permanent magnet can also be used on the stator, to enable the permanent magnet on the stator and a permanent magnet on the rotor to mutually produce magnetic field effects, and which technical method can be used to form a new varying compound magnetic field by superposing a varying electromagnetic field generated by a stator winding with a constant magnetic field of the stator and a constant magnetic field of the rotor, where a thrust force of the jointly generated new compound magnetic field rotates the rotor to do work externally. Meanwhile, a principle of a compound magnetic field element that successfully uses mutual interference and superposition of an electromagnetic field and a constant magnetic field in many current microelectronic products such as mobile phones or televisions also needs to be analyzed, to improve a manner or method of application to the field of power.

SUMMARY

For the foregoing existing problems, the present invention provides an AC permanent magnet motor that is environmentally-friendly and safe, has a novel structure, and operates reliably. The AC permanent magnet motor utilizes a superposition effect between strong constant magnetic fields of rare earth permanent magnets and a phenomenon that electromagnetic fields can also be superposed with each other, and adopts the feature that a three-phase AC power supply generates a rotating magnetic field in a motor stator coil. In correspondence with a phenomenon that a metal squirrel-cage-type frame on a motor rotor is rotated by a force generated by cutting magnetic lines in an alternating magnetic field, with reference to structural features of a permanent magnetic motor, the following improvements are made. The present invention provides an AC permanent magnet motor, including a stator and a rotor as one part and an external controller as the other part. Some cable troughs and some cores are machined on a silicon steel sheet laminated core of the stator of the AC permanent magnet motor. Same grooves are provided inside the cores, and same winding coils are imbedded in the cable troughs. Surface magnetic polarities of permanent magnets mounted in grooves of silicon steel cores of two same coils that are immediately adjacent to each other are different from each other. For the two coils, one is electrified by a forward current, and the other is electrified by a reverse current, so that polarities of electromagnetic fields respectively generated in the two coils are also opposite. Polarities of permanent magnets mounted in the two coils need to be the same as the polarities of the electromagnetic fields of the coils respectively, and shapes, dimensions, and magnetic parameters of the permanent magnets also need to be the same, similar to that in two opposite direct current (DC) electromagnetic coils, permanent magnets having polarities respectively the same as those of the two coils are mounted respectively. In this way, a new compound magnetic field generated because of homopolarity between an electromagnetic field of each coil and a constant magnetic field is enhanced due to a magnetic field superposition principle. Compared with an original single magnetic field, the compound magnetic field is enhanced, and the electromagnetic field can also magnetize and protect the permanent magnet, so that the permanent magnet would not be demagnetized. Some such combinations of two same coils respectively electrified by a forward or reverse current and cores form a coil unit. 2N same coil units form an in-phase coil, and every three in-phase coils form a stator three-phase coil where A+, B+, C+, A−, B−, C− and O lines are combined in a positive-negative correspondence manner. Some integer multiples of same three-phase coils form a complete stator coil of the motor. Stator coils are respectively inserted into the cable troughs of the core that is formed by laminating stator silicon steel sheets. The coils are inserted in a two-layer or multi-layer manner. Some permanent magnets having same polarities are mounted inside the grooves of the silicon steel sheet core of the stator, and permanent magnets mounted inside adjacent coils have opposite polarities. Grooves formed by machining a single silicon steel sheet have two shapes separately. One type is an open groove, and the other type is an enclosed groove. A surface of a silicon steel core formed by alternately laminating the two different types of grooves is hollow in a fence shape, so that permanent magnets mounted inside the grooves are alternately exposed from obvious gaps. The area of the exposed part is greater than one half of the area of a single pole of the permanent magnets. The stator three-phase coils have completely identical parameters, a Y star-shaped connection manner is used, and lead lines are three phase lines and one zero line. For example, the stator has 24 cable troughs and four poles, star connection is applied to the coils, and there are seven lead lines in total, that is, two groups of A, B and C phase lines and one zero line. The stator coil includes two groups of same three-phase AC coils that each are in 12 cable troughs and that each have four poles. A, B and C phase lines of the two groups of coils that each are in the 12 cable troughs and that each have the four poles are respectively electrified by a forward current and a reverse current. Waveforms of the currents are respectively positive and negative half-waveforms of a same sine-wave or step-wave pulse. The current waveforms and the pulses of the coils are all different from each other by a $\pi$ period. A feature of power input in each separate phase is that the amplitude of a pulsating magnetic motive force is located in a winding axis of the phase, where the position is fixed. When being observed on an oscilloscope, the two positive and negative half-waveforms are synthesized into a complete pulse sine wave or step wave. Magnetic motive forces of three single phases are added up, to obtain a synthetic magnetic motive force of the three-phase winding. Upon synthesis, potential angles of the three phase lines A, B and C having the 24 cable troughs and the four poles are different from each other by 120 degrees, and a frequency is between 20 Hz and 500 Hz, to facilitate speed regulation. For another example, the stator has 48 cable troughs, and uses two groups of same coils that each are in 24 cable troughs. Lead line ends cannot be interchanged. Because input half-wave currents have features of DC currents and include positive and negative polarities, if a line is connected incorrectly, the coil is burned. When connectors are interchanged, positive and negative connectors A+ and A− of the phase should be simultaneously interchanged with B+ and B− of another phase or C+ and C−, so that a rotation direction of the AC permanent magnet motor can be changed. A power source supplied to the AC permanent magnet motor is input by the controller. According to the power source and a configured AC permanent magnet motor, the controller includes some series products. A power source supplied to the controller includes multiple types of power sources such as a municipal three-phase power source, a battery DC power source, or a solar cell. If a three-phase AC power source is input, the power source is directly connected to a matched controller and is output after being rectified. If a DC power source is input, the power source needs to first pass through an inverter, then be input to the controller, and be output after being rectified. A main basic circuit for rectification in the controller is a three-phase fully-controlled rectifier circuit, and generates a three-phase half sine pulse wave. According to different requirements on a voltage, a current, and a power of a power source required by the AC permanent magnet motor, electronic elements in the three-phase fully-controlled rectifier basic circuit and the circuit are adjusted correspondingly. For example, three-phase fully-controlled diode (thyristor) rectifier circuits are mainly used for low power AC permanent magnet motors, three-phase fully-controlled MOS transistor rectifier circuits are mainly used for low and medium power AC permanent magnet motors, three-phase fully-controlled IGBT transistor rectifier circuits are mainly used for medium and high power AC permanent magnet motors, and superpower needs to be borne by integrated rectifier circuits that are more complex. Different series products of controllers are formed. To improve power supply quality, during the rectification, frequency translation and modulation, balancing reactance, and voltage stabilization and current stabilization also need to be performed on the controller, and an intelligent control circuit regulator, a switch, and the like form a control center integrator. Some sockets for connecting to an intelligent control circuit regulator are provided on the controller. Half sine-wave or step-wave pulse currents respectively having an upper half-waveform and a lower half-waveform are respectively supplied to two groups of paired coils in the three-phase stator coils of the AC permanent magnet motor. An N-pole electromagnetic field generated on a surface of one of the two electrified coil units, together with a magnetic field of an N-pole permanent magnet mounted inside a groove, forms a new compound N-pole magnetic field, and an S-pole electromagnetic field generated on a surface of the other one of the two electrified coil units, together with a magnetic field of an S-pole permanent magnet mounted inside a groove, forms a new compound S-pole magnetic field. Such a new compound magnetic field is neither the original electromagnetic field nor the original constant magnetic field of the permanent magnet, and is a new multiple dynamic compound magnetic field having magnetic field intensity greater than that of the original electromagnetic field and that of the constant magnetic field of the permanent magnet. Because addition of the constant magnetic field of the permanent magnet, the dynamic compound magnetic field attaches a design-controlled dynamic magnetic field feature to the constant magnetic field of the permanent magnet. The half sine waves, different from each other by a $\pi$ period, of pulse currents of the two groups of paired coil units simultaneously electrified comprehensively form a pulsating magnetic motive force having a complete single-phase sine wave or step wave. When the comprehensively formed single-phase sine-wave or step-wave current is supplied as a three-phase current having a 120-degree potential angle, one group of same three-phase sine-wave currents or one group of complete step-waves are formed, that is, a rotating magnetic field is generated. A silicon steel laminated sheet body of the rotor of the AC permanent magnet motor is provided with a squirrel cage structure made of copper or aluminum. A groove is provided on a silicon steel laminated sheet of the rotor in a gap between squirrel-cage bars. A recessed permanent magnet is mounted in the groove. The squirrel cage and the grooves have inclination angles, and the inclination ranges from a half of a groove to two grooves. A ratio of stator grooves to rotor grooves is designed according to common AC motors. Enclosed squirrel-cage bars on the rotor generate a torque by cutting rotating magnetic lines, to drive the rotor to rotate toward one direction. At the same time, the permanent magnets on the rotor are also affected by and participate in function of the compound magnetic field of the stator, to drive the rotor to rotate. For each of the permanent magnets mounted in the silicon steel grooves, aluminum plates are mounted on two sides to isolate the magnetic field and protect the magnetic field from leaking. The number of silicon steel cable troughs on the stator of the AC permanent magnet motor is an integer multiple of 6 such as 6, 12, 24, 48, 96, 192, or 384, and so forth. For heat dissipation, wrinkles and patterns are made on a surface of a housing of the AC permanent magnet motor, to increase the surface area of the housing. Fixed fan blades are attached inside the rotor. The AC permanent magnet motor has a structure having an outer rotating hub and an inner stator or a structure having an outer fixed hub and an inner rotating pivot. Structural styles of inner casings and housings of the rotor and the stator are designed and configured according to requirements of an associated device, so as to meet general requirements of the device. Connectors of some lead lines of a winding of the stator coil in the AC permanent magnet motor are connected to a dedicated plug having seven pins in total including six live line pins and one zero line pin in advance according to design requirements. During use, the dedicated plug is inserted into an associated dedicated socket, and the number and sectional shapes and dimensions of metal pins of the dedicated plug are the same as those of jacks of the dedicated socket. Power output lines of the controller are connected to a dedicated socket having seven jacks in total including six live line jacks and one zero line jack, so that the dedicated socket is not only conveniently used, but also is safe and reliable. In conclusion, the controller is required to output some groups of direct currents each having a half sine wave pulse to the stator coils of the AC permanent magnet motor, forming a waveform feature form of a three-phase AC current in some groups of stator coils comprehensively and in sequence, and forming a rotating magnetic field in air gaps, so that the rotor is rotated by a force to output power.

The technical solution provided by the present invention is an AC permanent magnet motor, including a stator and a rotor as one part and an external controller as the other part. Some cable troughs and some cores are machined on a silicon steel sheet laminated core of the stator of the AC permanent magnet motor. Same grooves are provided inside the cores, and same winding coils are inserted into the cable troughs. Surface magnetic polarities of permanent magnets mounted in grooves of silicon steel cores of two same coils that are immediately adjacent to each other are different from each other. One single-phase power source is supplied to one group of coil units. The coil unit includes an integer multiple of at least two same stator cores and permanent magnets in the grooves. If a two-layer coil is inserted into each cable trough, the coil unit further includes three same cable troughs and four same coils. Among the four coils, one side of each of two coils is inserted into the cable trough between two cores, forming a two-layer winding in the cable trough. The other two coils are respectively inserted into the other two cable troughs that are adjacent to the two cores, forming one-layer windings in the other two cable troughs, the other winding is formed by inserting a corresponding coil of another coil unit that is immediately adjacent to the coil unit, forming two-layer windings in the other two cable troughs, and so on, so that windings of a whole stator coil are inserted. For the two coils in the coil unit, one is electrified by a forward current, and the other is electrified by a reverse current, so that polarities of electromagnetic fields respectively generated in the two coils are also opposite. Polarities of permanent magnets mounted in the two coils need to be the same as the polarities of the electromagnetic fields of the coils respectively, and shapes, dimensions, and magnetic parameters of the permanent magnets also need to be the same, similar to that in two opposite DC electromagnetic coils, permanent magnets having polarities respectively the same as those of the two coils are mounted respectively, that is, a reference DC electromagnet. In this way, a new compound magnetic field generated because of homopolarity between an electromagnetic field of each coil and a constant magnetic field is enhanced due to a magnetic field superposition principle. Compared with an original single magnetic field, the compound magnetic field is enhanced, and the electromagnetic field can also magnetize and protect the permanent magnet, so that the permanent magnet would not be demagnetized. Some such combinations of two same coils respectively electrified by a forward or reverse current and cores form a coil unit. 2N same coil units form an in-phase coil, and every three in-phase coils form a stator three-phase coil where A+, B+, C+, A−, B−, C− and O lines are combined in a positive-negative correspondence manner. Some integer multiples of same three-phase coils form a complete stator coil of the motor.

Stator coils of the AC permanent magnet motor are respectively inserted into the cable troughs of the core that is formed by laminating stator silicon steel sheets. The coils are inserted in a two-layer or multi-layer manner. Some permanent magnets having same polarities are mounted inside the grooves of the silicon steel sheet core of the stator, and permanent magnets mounted inside adjacent coils have opposite polarities. Grooves formed by machining a single silicon steel sheet have two shapes separately. One type is an open groove, and the other type is an enclosed groove. A surface of a silicon steel core formed by alternately laminating the two different types of grooves is hollow in a fence shape, so that permanent magnets mounted inside the grooves are alternately exposed from obvious gaps. The area of the exposed part is greater than one half of the area of a single pole of the permanent magnets. The stator three-phase coils have completely identical parameters, a Y star-shaped connection manner is used, and lead lines are three phase lines and one zero line. For example, the stator has 24 cable troughs and four poles, star connection is applied to the coils, and there are seven lead lines in total, that is, two groups of A, B and C phase lines and one zero line. The stator coil includes two groups of same three-phase AC coils that each are in 12 cable troughs and that each have four poles. A, B and C phase lines of the two groups of coils that each are in the 12 cable troughs and that each have the four poles are respectively electrified by a forward current and a reverse current. Waveforms of the currents are respectively positive and negative half-waveforms of a same sine-wave or step-wave pulse. The current waveforms and the pulses of the coils are all different from each other by a $\pi$ period. A feature of power input in each separate phase is that the amplitude of a pulsating magnetic motive force is located in a winding axis of the phase, where the position is fixed. When being observed on an oscilloscope, the two positive and negative half-waveforms are synthesized into a complete pulse sine wave or step wave. Magnetic motive forces of three single phases are added up, to obtain a synthetic magnetic motive force of the three-phase winding. Upon synthesis, potential angles of the three phase lines A, B and C having the 24 cable troughs and the four poles are different from each other by 120 degrees, and a frequency is between 20 Hz and 500 Hz, to facilitate speed regulation. For another example, the stator has 48 cable troughs, and uses two groups of same coils that each are in 24 cable troughs. Lead line ends cannot be interchanged. Because input half-wave currents have features of DC currents and include positive and negative polarities, if a line is connected incorrectly, the coil is burned. When connectors are interchanged, positive and negative connectors A+ and A− of the phase should be simultaneously interchanged with B+ and B− of another phase or C+ and C−, so that a rotation direction of the AC permanent magnet motor can be changed. The number of silicon steel cable troughs on the stator core is an integer multiple of 6 such as 6, 12, 24, 48, 96, 192, or 384, and so forth. When a two-layer coil or a multi-layer coil whose the number of layers is an integer multiple of two is inserted into a cable troughs, a current actually flowing in the two-layer coil in the cable trough is in an AC state during oscillation, and a same resistance value is generated in a coil in each related cable trough. An effective magnetic length L of the stator includes a whole segment or some same segments, and facilitates optimizing a slenderness ratio. The AC permanent magnet motor should be manually rotatable when it is shut down and still. For heat dissipation, wrinkles and patterns are made on a surface of a housing of the AC permanent magnet motor, to increase the surface area of the housing. Fixed fan blades are attached inside the rotor. Insulation treatment needs to be performed when silicon steel sheets are laminated and the coils are machined.

For the AC permanent magnet motor, a power source supplied to the AC permanent magnet motor is input by the controller. According to the power source and a configured AC permanent magnet motor, the controller includes some series products. A power source supplied to the controller includes multiple types of power sources such as a municipal three-phase power source, a battery DC power source, or a solar cell. If the power source is a three-phase AC power source, the power source is directly connected to a matched controller and is output after being rectified. If the power source is a DC power source, the power source needs to first pass through an inverter, then be input to the controller, and be output after being rectified. A main basic circuit for rectification in the controller is a three-phase fully-controlled rectifier circuit, and generates a three-phase half sine pulse wave. According to different requirements on a voltage, a current, and a power of a power source required by the AC permanent magnet motor, electronic elements in the three-phase fully-controlled rectifier basic circuit and the circuit are adjusted correspondingly. For example, three-phase fully-controlled diode (thyristor) rectifier circuits are mainly used for low power AC permanent magnet motors, three-phase fully-controlled MOS transistor rectifier circuits are mainly used for low and medium power AC permanent magnet motors, three-phase fully-controlled IGBT transistor rectifier circuits are mainly used for medium and high power AC permanent magnet motors, and superpower needs to be borne by high power controllable integrated rectifier circuits. Different series products of controllers are formed. During the rectification, frequency translation and modulation, balancing reactance, and voltage stabilization and current stabilization also need to be performed on the controller, and an intelligent control circuit regulator, a switch, and the like form a control center integrator. Expansion space for some sockets for connecting to an intelligent control circuit regulator is provided on the controller. Power sources of half sine-wave or step-wave pulse currents respectively having an upper half-waveform and a lower half-waveform are respectively supplied to two groups of paired coils in the three-phase stator coils of the AC permanent magnet motor. One single-phase power source is supplied to one group of coil units. An N-pole electromagnetic field generated on a surface of one of the two electrified coil units, together with a magnetic field of an N-pole permanent magnet mounted inside a groove, forms a new compound N-pole magnetic field, and an S-pole electromagnetic field generated on a surface of the other one of the two electrified coil units, together with a magnetic field of an S-pole permanent magnet mounted inside a groove, forms a new compound S-pole magnetic field. Such a new compound magnetic field is neither the original electromagnetic field nor the original constant magnetic field of the permanent magnet, and is a new dynamic compound magnetic field having a dynamic waveform of the original electromagnetic field and having magnetic field intensity greater than that of the original electromagnetic field and that of the constant magnetic field of the permanent magnet. Because addition of the constant magnetic field of the permanent magnet, the dynamic compound magnetic field attaches a design-controlled dynamic magnetic field feature to the constant magnetic field of the permanent magnet. The half sine waves, different from each other by a π period, of pulse currents of the two groups of paired coil units simultaneously electrified comprehensively form a pulsating magnetic motive force having a complete single-phase sine wave or step wave. When the comprehensively formed single-phase sine-wave or step-wave current is supplied as a three-phase current having a 120-degree potential angle, one group of same three-phase sine-wave currents or one group of complete step-waves are formed, that is, a rotating magnetic field is generated.

Connectors of some lead lines of a winding of the stator coil in the AC permanent magnet motor are connected to a dedicated plug in advance according to design requirements. During use, the dedicated plug is inserted into an associated seven-jack dedicated socket, and the number and sectional shapes and dimensions of metal pins of the dedicated plug are completely the same as those of jacks of the dedicated socket. Power output lines and other function control output lines of the controller are connected to a dedicated socket in advance according to design requirements.

For the AC permanent magnet motor, the rotor of the AC permanent magnet motor is separated from the surface of a stator permanent magnet by an air gap. When the AC permanent magnet motor is in a static state, a rotary disc can freely rotate around a main shaft. The number of grooves on the silicon steel sheet of the stator, the type of the grooves, the number of turns of a coil, a line diameter, and a connection manner all meet a specification for designing and manufacturing a motor. At the same time, characteristics of the rare earth permanent magnet are displayed. When the stator coil is electrified, the intensity of an electromagnetic field generated on the surface of a pole head of the stator core is not greater than data of a magnetic coercive force of the permanent magnet. A silicon steel laminated sheet body of the rotor core is provided with a squirrel cage structure made of copper or aluminum. A groove is provided on a silicon steel laminated sheet of the rotor in a gap between squirrel-cage bars. A recessed permanent magnet is mounted in the groove. The squirrel cage bars have inclination angles, and the inclination ranges from a half of a groove to two grooves. A ratio of stator grooves to rotor grooves is designed according to common AC motors. Enclosed squirrel-cage bars on the rotor generate a torque by cutting rotating magnetic lines, to drive the rotor to rotate toward one direction. At the same time, the permanent magnets on the rotor are also affected by and participate in function of the compound magnetic field of the stator. For each of the permanent magnets mounted in the silicon steel grooves, aluminum plates are mounted on two sides to isolate the magnetic field and protect the magnetic field from leaking. For heat dissipation, the permanent magnet is packed with a graphite film material with high thermal conductivity.

The AC permanent magnet motor has a structure having an outer rotating hub and an inner stator or a structure having an outer fixed hub and an inner rotating pivot. Structural styles of inner casings and housings of the rotor and the stator are designed and configured according to requirements of an associated device, so as to meet general requirements of the device. Electromagnetic phenomena and principles of converting mechanical energy into electric energy of the stator and the rotor in the two types of motors are basically the same, and many generic technologies exist. For the AC permanent magnet motor whose stator is inside the outer rotating hub, different types of motors are formed when different parts are configured to be connected to the outer rotating hub. For example, if a tire is disposed on the outer rotating hub, the AC permanent magnet motor is an AC fully-magnetic power machine for a hub of a vehicle. If a gear or a belt pulley is disposed on the outer rotating hub, the AC permanent magnet motor is an AC permanent magnet motor directly providing a driving force to a mechanical device. If an output shaft, a support, and a protective cover of the housing are disposed on the outer rotating hub, the AC permanent magnet motor is a rotation shaft output-type AC fully-magnetic power machine applicable to common machines and tools. Because the rotational inertia is proportional to a square of a radius, the rotational inertia of the AC permanent magnet motor having the outer rotating hub is greater than that of the AC permanent magnet motor having the inner pivot. The housing of the motor is made of a magnetic insulation material having high strength. As the intensity of an inherent constant magnetic field of a combination of permanent magnets is higher, more converted mechanical energy is output. The AC permanent magnet motor starts operation when the power source is turned on, and stops the operation when the power source is turned off.

The AC permanent magnet motor having the structure with the fixed hub and the inner rotating pivot includes some compound magnetic heads in coils of some cable troughs on the silicon steel laminated sheet body of the stator, a main shaft, a silicon steel laminated sheet body on the rotor, and the rotor including a squirrel-cage framework on the rotor, the recessed permanent magnet, and the inner pivot. The rotor is separated from the surface of the permanent magnet of the stator by an air gap. The main shaft is mounted in the center of the inner pivot of the rotor, and bearings are mounted at two ends of the inner pivot. In addition, the inner pivot is connected to the stator hub by using the bearings. A mesh structure in a fence shape on the surface of a compound magnetic head of a groove facilitates operation magnetic path smoothness of magnetic lines of the compound magnetic head including the permanent magnet. The motor stator has an even number of independent three-phase windings. Each winding includes some coils, and the coil windings are sequentially inserted into the cable troughs of the silicon steel laminated cores of the stator. The coil winding and the permanent magnets of the stator mounted in the grooves jointly form some pairs of compound magnetic heads of the stator. A compound magnetic head that is controlled during operation generates a controllable instant induction alternating electromagnetic field, to form a rotating magnetic field. In this case, the compound magnetic head has a function of changing the magnetic field, to reduce magnetic resistance and change the intensity of the constant magnetic field. Superposition or interference of magnetic fields of same polarities or different polarities of the compound magnetic head facilitates smooth and continuous rotation of the stator permanent magnet and the rotor permanent magnet that are correspondingly mounted on the rotary disc under an action force of magnetic energy.

Beneficial effects of the present invention are: The present invention provides an AC permanent magnet motor that is environmentally-friendly and safe, has a novel structure, and operates reliably. The controller is required to output some groups of direct currents each having a half sine wave pulse to the stator coil of the AC permanent magnet motor, forming a feature form of a three-phase AC in some groups of stator coils comprehensively and sequentially, and forming a rotating magnetic field in an air gap, so that the rotor is rotated by a force to output power. A direct current having a half sine wave pulse is input to the AC permanent magnet motor, and is similarly converted into a three-phase AC form in a coil combination. Because of advantages and features of a rotating magnetic field generated in air gaps of paired three-phase coils on the stator of the AC permanent magnet motor and a phenomenon that a metal squirrel-cage framework on the corresponding rotor of the AC permanent magnet motor is rotated by a force generated by cutting magnetic lines in an alternating magnetic field, advantages and features of the foregoing structure on a conventional AC motor are reserved, and the following improvements are made: Some permanent magnets are mounted on a silicon steel laminated body of the rotor and forms, together with squirrel-cage frameworks on surfaces of the permanent magnets disposed on the rotor, a rotor combination. Due to participation of the permanent magnets on the rotor, a rotating torque of the rotor combination is increased. The surface of a compound magnetic head of the silicon steel laminated body on the stator core surrounded by the stator coils have grooves, and some stator permanent magnets are placed in the grooves. The stator permanent magnets mounted in the grooves and a mesh structure in a fence shape form a compound magnetic head of the stator. The AC permanent magnet motor is designed and manufactured according to a motor specification. Meanwhile, features and characteristics of the permanent magnet of the AC permanent magnet motor are added, and based on this, strong permanent magnets are introduced into the rotor and the stator, forming a new rotor combination structure and a new stator combination structure. After the motor operates for a period of time, mutual magnetic forces between the permanent magnets attenuate to a degree, the permanent magnets need to be replaced with new ones or be used after they are magnetized. The motor is suitable for operation at a voltage less than 380 V. When the motor is used, a voltage-regulating frequency converter needs to be configured to provide a three-phase AC power source that is used after rectification. When a battery DC power source is used, the power source needs to flow through an inverter and a voltage-regulating frequency converter where rectification is performed, to change the power source into a suitable power source having a half sine wave pulse to supply power. The rotating magnetic field generated in the three-phase coil combination drives the rotor to rotate, so that an application scope of the AC permanent magnet motor is also greatly expanded. The motor provides novel environmentally-friendly and renewable energy, has nearly zero emission and zero pollution, saves energy, and is safe. Costs for using the motor are low, and the failure rate is low. The motor can stably operate in an air-free environment, and is widely used in various power devices, for example, as a power source in a special environment condition or a power source of a mobile robot. The motor has very high social and economic values. Therefore, according to the present invention, the controller is initially required to output some groups of DCs each having a half sine wave pulse to the stator coils of the AC permanent magnet motor, a three-phase AC waveform feature is comprehensively and sequentially formed in the stator coils, and the rotating magnetic field is formed in the air gaps, so that the rotor is rotated by a force to output power.

In the figures: 1. AC permanent magnet motor; 2. stator; 3. rotor; 4. stator core; 5. air gap; 6. stator permanent magnet; 7. motor housing; 8. main shaft; 9. cable trough; 10. groove; 11. coil; 12. squirrel cage; 13. rotor permanent magnet; 14. aluminum plate; 15. connection line; 16. graphite film; 17. hollow shaft; 18. mounting groove; 19. enclosed groove; 20. open groove; 21. black bold line A+ showing a single-phase positive half sine pulse waveform; 22. black bold line A− showing a single-phase negative half sine pulse waveform; 23. three-phase rectification positive half sine pulse waveform; 24. three-phase rectification negative half sine pulse waveform; 25. outer rotating hub; 26. AC three-phase power source; 27. DC/AC single-phase power source; 28. charger; 29. storage battery pack; 30. controller; 31. DC/AC three-phase inverter; 32. control center integrator; 33. switch; 34. socket for an intelligent control circuit regulator; 35. switch; 36. rotor core.

DETAILED DESCRIPTION

Figure 1:
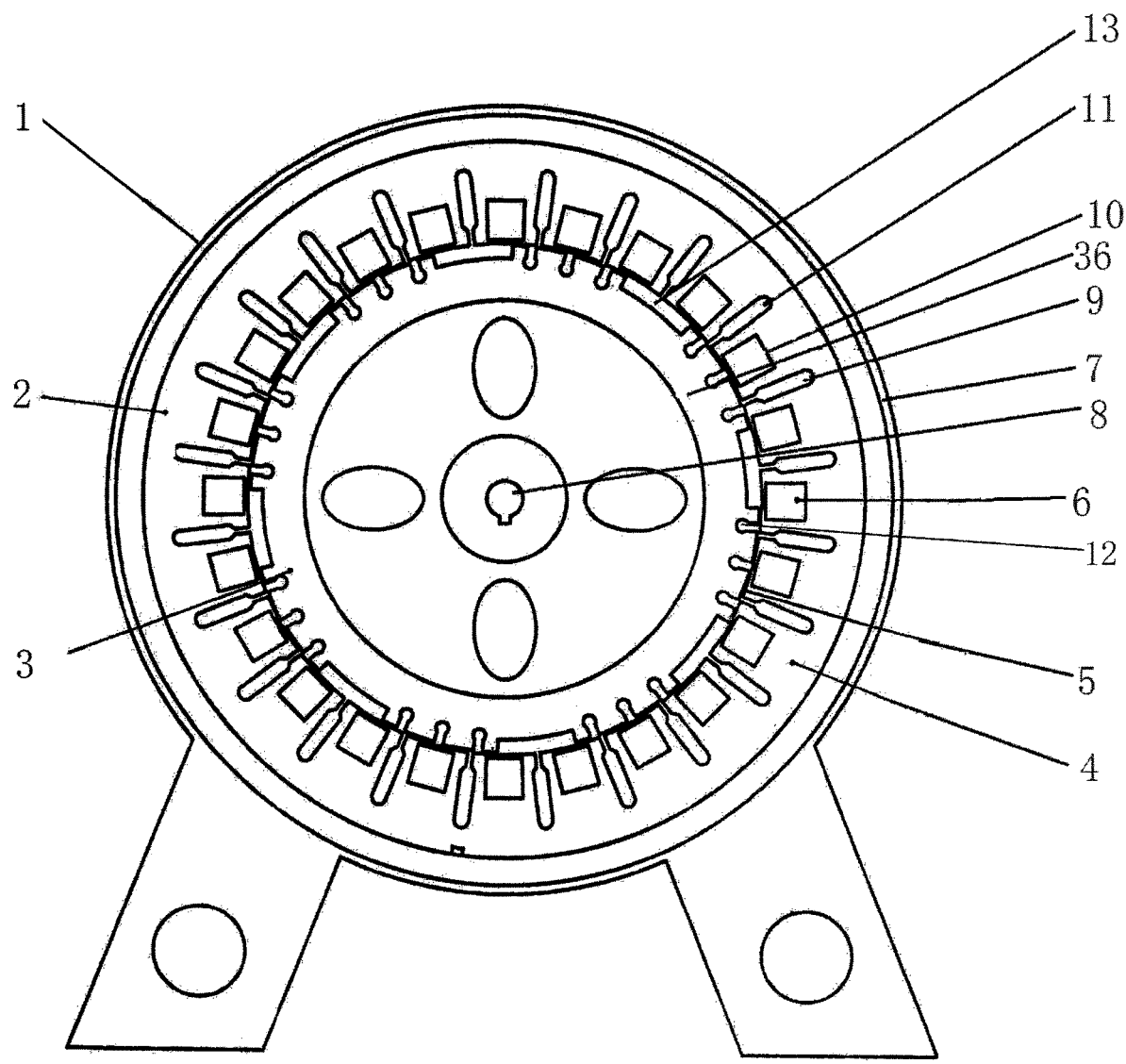
FIG. 1 is a schematic sectional view of an AC permanent magnet motor having a fixed hub and an inner rotating pivot according to the present invention, and is also an accompanying drawing of ABSTRACT.
Figure 2:
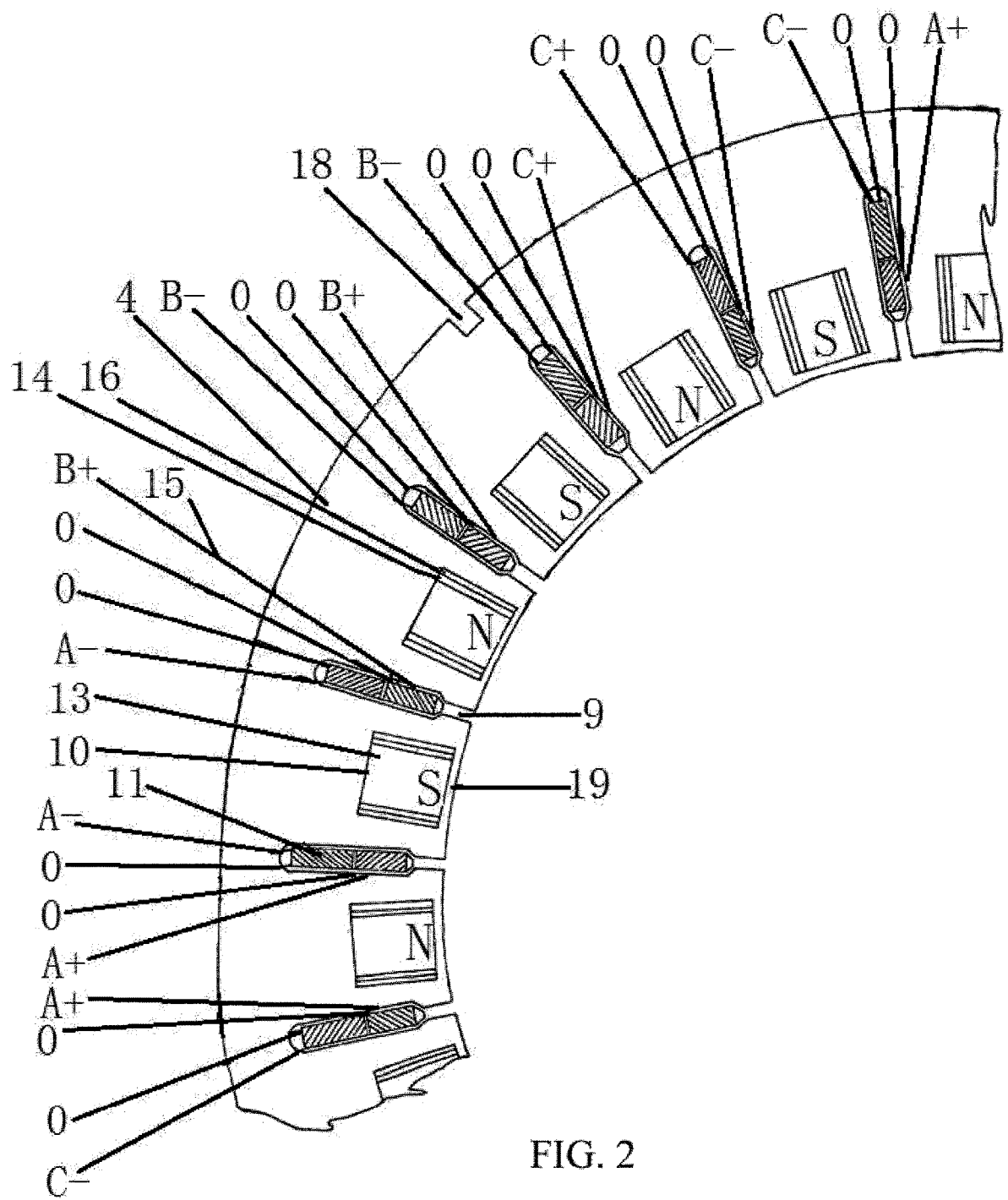
FIG. 2 is a schematic partial view of enclosed grooves of stator silicon steel sheets of an AC permanent magnet motor having an outer fixed hub and an inner rotating pivot and a schematic diagram of lead lines of some stator coils according to the present invention.
Figure 3:
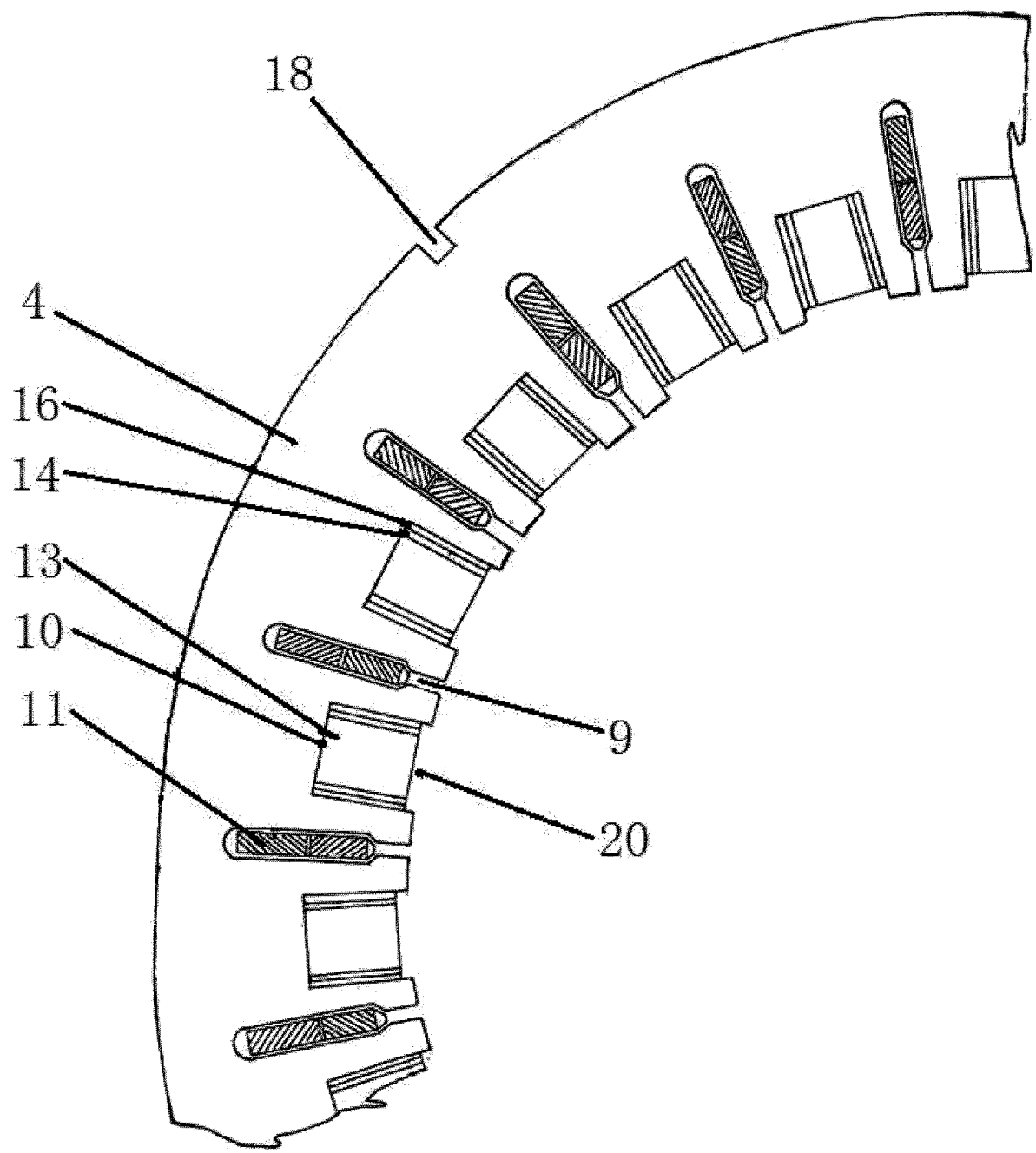
FIG. 3 is a schematic partial view of open grooves of stator silicon steel sheets of an AC permanent magnet motor having an outer fixed hub and an inner rotating pivot according to the present invention.

In embodiments of the present invention, with reference to FIG. 1, FIG. 2, FIG. 3, FIG. 4, FIG. 5, and FIG. 6, an AC permanent magnet motor 1 has a structure having an outer rotating hub and an inner stator or a structure having an outer fixed hub and inner rotating pivot. When sample design is researched, a wiring diagram of two-layer, cross, and short-distance windings that have 24 cable troughs and four poles in a most frequently used three-phase asynchronous motor is selected from a diagram set of commercially available motors. The AC permanent magnet motor 1 includes a stator 2 and a rotor 3 as one part and an external controller 30 as the other part. Some cable troughs 9 and some stator cores 4 are machined on the stator 2 of the AC permanent magnet motor. Same grooves 10 are provided inside the stator cores 4, and same winding coils 11 are inserted into the cable troughs 9. Surface magnetic polarities of permanent magnets 6 mounted in grooves 10 of stator cores of two same coils 11 that are immediately adjacent to each other are different from each other. One single-phase power source is supplied to one group of coil units. Referring to FIG. 2, the coil unit includes an integer multiple of at least two adjacent same stator cores 4 and permanent magnets 6 in the grooves 10. If a two-layer coil is inserted into each cable trough 9, the coil unit further includes three same cable troughs 9 and four same coils 11. Among the four coils 11, one side of each of two coils 11 is inserted into the cable trough 9 between two cores 4, forming a two-layer winding in the cable trough 9. The other two coils 11 are respectively inserted into the other two cable troughs 9 that are adjacent to the two cores 4, forming one-layer windings in the other two cable troughs 9, the other winding is formed by inserting a corresponding coil 11 of another coil unit that is immediately adjacent to the coil unit, forming two-layer windings in the other two cable troughs 9, and so on, so that a process of inserting windings of a whole stator coil 11 is completed. For the two coils 11, one is electrified by a forward current, and the other is electrified by a reverse current, so that polarities of electromagnetic fields respectively generated in the two coils 11 are also opposite. Polarities of permanent magnets 6 mounted in the two coils 11 need to be the same as the polarities of the electromagnetic fields of the coils 11 respectively, and shapes, dimensions, and magnetic parameters of the permanent magnets 6 also need to be the same, similar to that in two opposite DC electromagnetic coils 11, permanent magnets having polarities respectively the same as those of the two coils 11 are mounted respectively. In this way, a new compound magnetic field generated because of homopolarity between an electromagnetic field of each coil 11 and a constant magnetic field is enhanced due to a magnetic field superposition principle. Compared with an original single magnetic field, the compound magnetic field is enhanced, and the electromagnetic field can also magnetize and protect the permanent magnet 6, so that the permanent magnet 6 would not be demagnetized. Some such combinations of two same coils 11 respectively electrified by a forward or reverse current and stator cores 4 form a coil unit. 2N same coil units form an in-phase coil, and every three in-phase coils form a stator three-phase coil where A+, B+, C+, A−, B−, C− and O lines are combined in a positive-negative correspondence manner. Some integer multiples of same three-phase coils form a complete stator coil of the motor.

Figure 4:
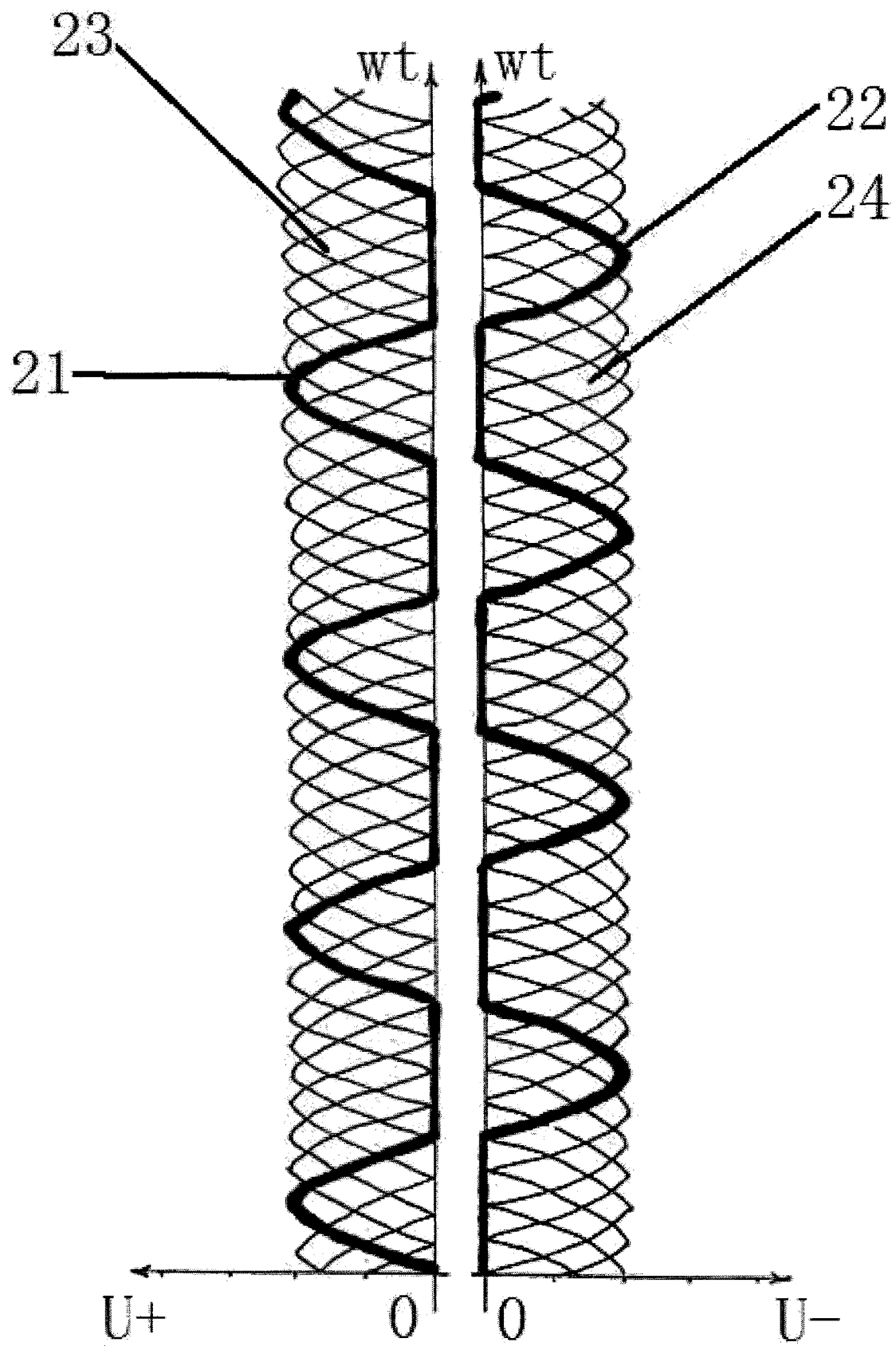
FIG. 4 is a schematic diagram of waveforms of a power source on a three-phase fully-controlled rectification output end of a controller of an AC permanent magnet motor according to the present invention.
Figure 5:
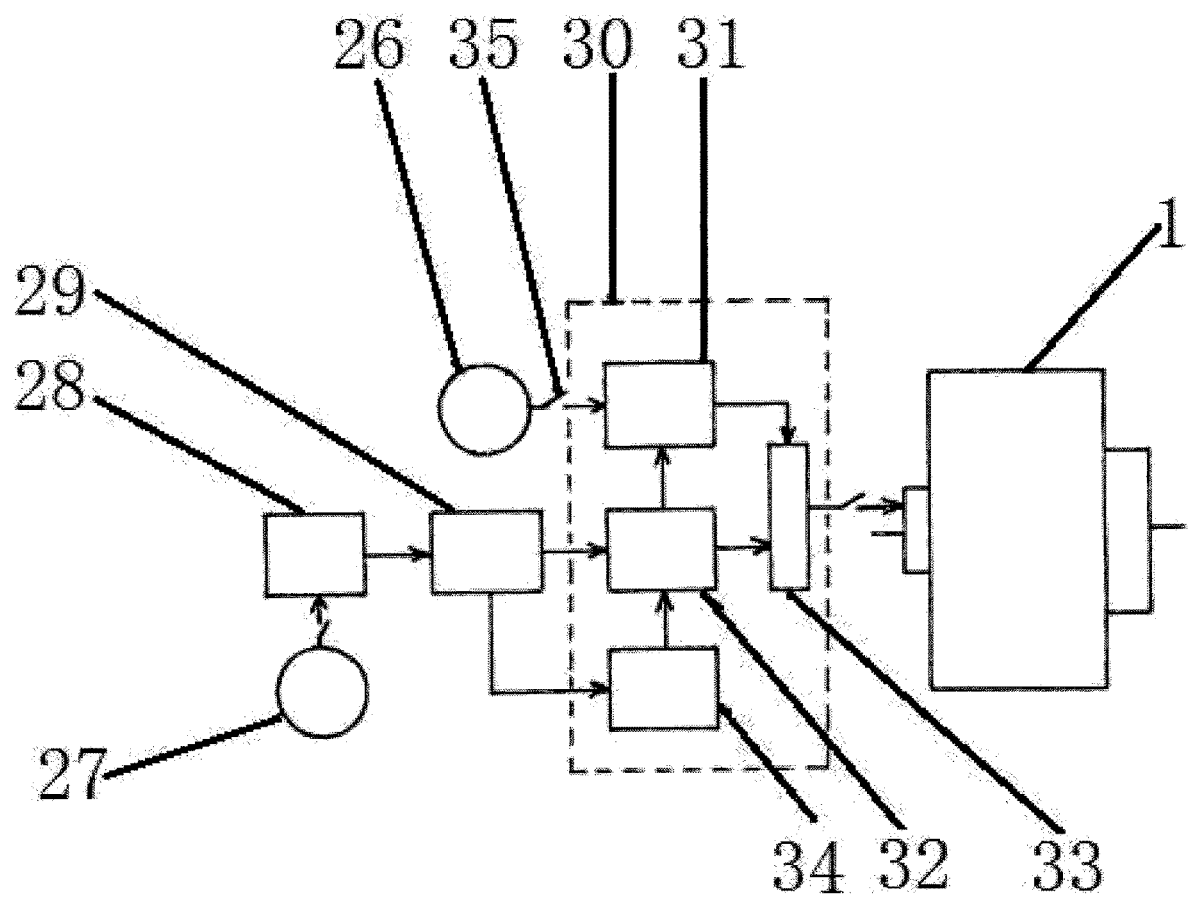
FIG. 5 is a schematic diagram of an AC permanent magnet motor and a controller system according to the present invention.
Figure 6:
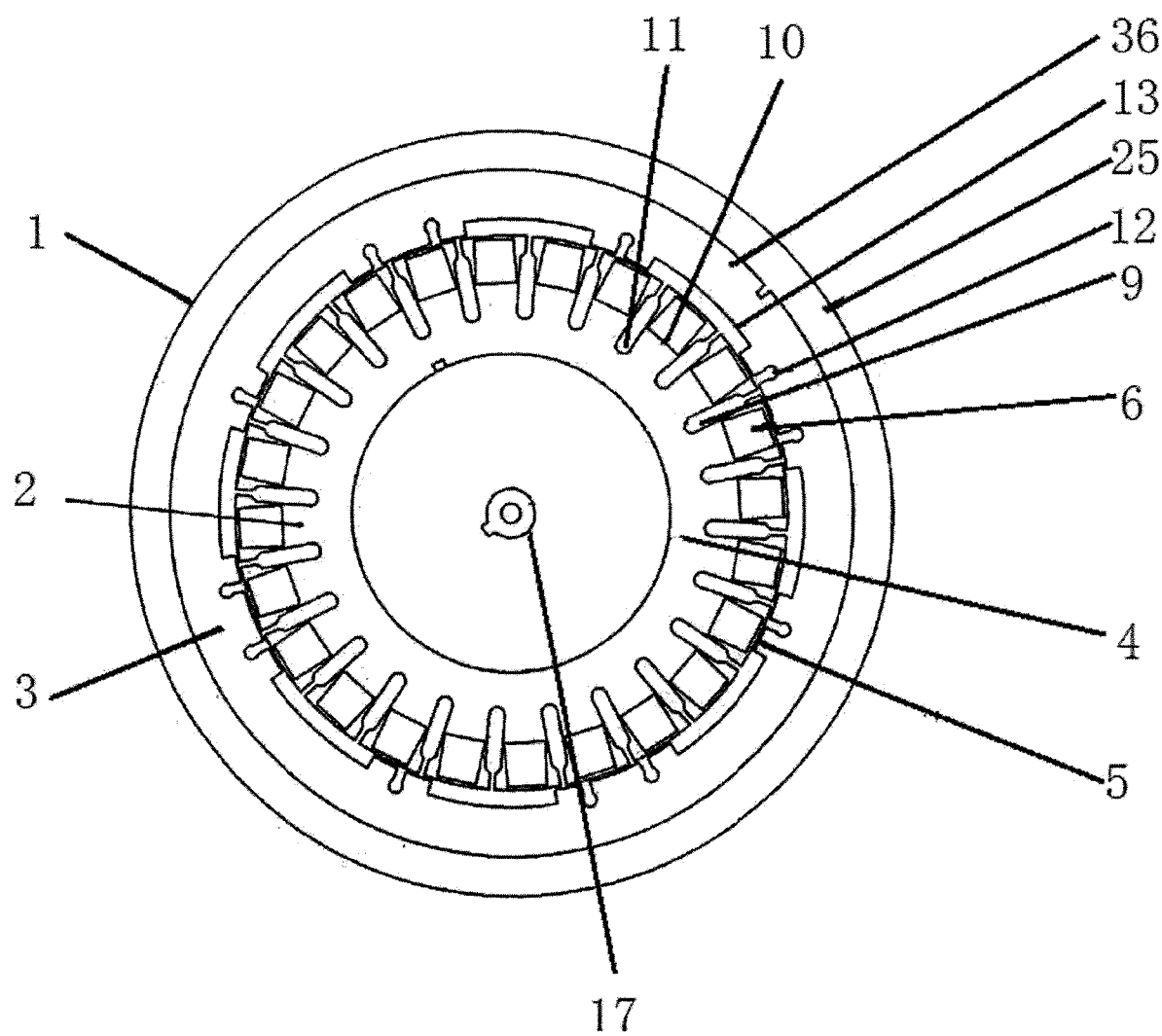
FIG. 6 is a schematic sectional view of an AC permanent magnet motor having an outer rotating hub and an inner stator according to the present invention.

Stator coils 11 of the AC permanent magnet motor 1 are respectively inserted into the cable troughs 9 of the stator core 4 that is formed by laminating stator silicon steel sheets. The coils 11 are inserted in a two-layer or multi-layer manner. Some permanent magnets 6 having same polarities are mounted inside the grooves 10 of the stator core 4, and permanent magnets 6 mounted inside adjacent coils 11 have opposite polarities. Grooves 10 formed by machining a single silicon steel sheet have two shapes separately. One type is an open groove 20, and the other type is an enclosed groove 19. A surface of a stator core formed by alternately laminating the two different types of grooves 10 is hollow in a fence shape, so that stator permanent magnets 6 mounted inside the grooves 10 are alternately exposed from obvious gaps. The area of the exposed part is greater than one half of the area of a single pole of the permanent magnets 6. The stator three-phase coils have completely identical parameters, a Y star-shaped connection manner is used, and lead lines are three phase lines and one zero line. For example, the stator has 24 cable troughs and four poles, star connection is applied to the coils, and there are seven lead lines in total, that is, two groups of A, B and C phase lines and one zero line. The stator coil 11 includes two groups of same three-phase coils 11 that each are in 12 cable troughs and that each have four poles. A, B and C phase lines of the two groups of coils that each are in the 12 cable troughs and that each have the four poles are respectively electrified by a forward current and a reverse current. Waveforms of the currents are respectively same three-phase rectification positive half sine pulse waveforms 23 and three-phase rectification negative half sine pulse waveform 24. The current waveforms and the pulses of the coils 11 are all different from each other by a π period. A feature of power input in each separate phase is that the amplitude of a pulsating magnetic motive force is located in a winding axis of the phase, where the position is fixed. When being observed on an oscilloscope, the two positive and negative half-waveforms are synthesized into a complete pulse sine wave or step wave, as shown in by a black bold line A+ showing a single-phase positive half sine pulse waveform 21 and a black bold line A− showing a single-phase negative half sine pulse waveform 22 in FIG. 4. Magnetic motive forces of three single phases are added up, to obtain a synthetic magnetic motive force of the three-phase winding, as shown in FIG. 4. It should be noted that to facilitate analysis, a lateral axis ωt in the figure is drawn as two axes, and the two axes are actually a same lateral axis ωt. Lead line ends of the coils 11 cannot be interchanged. Because input half-wave currents have features of DC currents and include positive and negative polarities, if a line is connected incorrectly, the coil is burned. When connectors are interchanged, positive and negative connectors A+ and A− of the phase should be simultaneously interchanged with B+ and B− of another phase or C+ and C−, so that a rotation direction of the AC permanent magnet motor can be changed. The number of cable troughs on the stator core 4 is an integer multiple of 6 such as 6, 12, 24, 48, 96, 192, or 384, and so forth. For each of the permanent magnets 6 mounted in the silicon steel grooves 10, aluminum plates 14 are mounted on side surfaces to isolate the magnetic field and protect the magnetic field from leaking. For heat dissipation, the permanent magnet is packed with a graphite film 16 material with high thermal conductivity. For heat dissipation, wrinkles and patterns are made on a surface of a housing 7 of the motor, to increase the surface area of the housing. Fixed fan blades are attached inside the rotor 3. Insulation treatment needs to be performed when silicon steel sheets are laminated and the coils 11 are machined.

For the AC permanent magnet motor 1, a power source supplied to the AC permanent magnet motor is input by the controller 30. According to the power source and a configured AC permanent magnet motor 1, the controller 30 includes some series products. A power source supplied to the controller 30 includes multiple types of power sources such as a municipal three-phase AC power source 26, a DC power source of a storage battery pack 29, or a solar cell. If the power source is the three-phase AC power source 26, the power source is directly connected to a matched controller 30 and is output after three-phase fully-controlled rectification. If the power source is a DC/AC singe-phase power source 27, the power source needs to first pass through a charger 28, then be input to the storage battery pack 29, be supplied to a control center integrator 32, then be input to the controller 30, and be output after three-phase fully-controlled rectification. A main basic circuit for rectification in the controller 30 is a three-phase fully-controlled rectifier circuit, and generates a three-phase rectification positive half sine pulse wave 23 and a three-phase rectification negative half sine pulse wave 24. According to different requirements on a voltage, a current, and a power of a power source required by the AC permanent magnet motor 1, electronic elements in the three-phase fully-controlled rectifier basic circuit and the circuit are adjusted correspondingly. For example, three-phase fully-controlled diode (thyristor) rectifier circuits are mainly used for low power AC permanent magnet motors 1, three-phase fully-controlled MOS transistor rectifier circuits are mainly used for low and medium power AC permanent magnet motors 1, three-phase fully-controlled IGBT transistor rectifier circuits are mainly used for medium and high power AC permanent magnet motors 1, and superpower needs to be borne by high power controllable integrated three-phase fully-controlled rectifier circuits. Different series products of controllers 30 are formed. During the rectification, frequency translation and modulation, balancing reactance, and voltage stabilization and current stabilization also need to be performed on the controller 30, and an intelligent control circuit regulator, a switch 33, and the like form the control center integrator 32 of the controller 30. Expansion space for some sockets 34 for connecting to the intelligent control circuit regulators is provided on the controller 30. Power sources of half sine-wave or step-wave pulse currents respectively having an upper half-waveform and a lower half-waveform are respectively supplied to the three-phase stator coils 11 of the AC permanent magnet motor 1. One single-phase power source is supplied to one group of coil units. An N-pole electromagnetic field generated on a surface of one of the two electrified coil units, together with a magnetic field of an N-pole permanent magnet mounted inside a groove 10, forms a new compound N-pole magnetic field, and an S-pole electromagnetic field generated on a surface of the other one of the two electrified coil units, together with a magnetic field of an S-pole permanent magnet mounted inside a groove 10, forms a new compound S-pole magnetic field. The half sine waves, different from each other by a $\pi$ period, of pulse currents of the two groups of paired coil units simultaneously electrified comprehensively form a pulsating magnetic motive force having a complete single-phase sine wave or step wave. When the comprehensively formed single-phase sine-wave or step-wave current is supplied as a three-phase current having a 120-degree potential angle, one group of same three-phase sine-wave currents or one group of complete step-waves are formed, that is, a rotating magnetic field is generated.

Connectors of some lead lines of a winding 11 of the stator coil in the AC permanent magnet motor 1 are connected to a dedicated plug having seven pins in total including six live line pins and one zero line pin in advance according to design requirements. During use, the dedicated plug is inserted into an associated dedicated socket, and the number and sectional shapes and dimensions of metal pins of the dedicated plug are completely the same as those of jacks of the dedicated socket. Power output lines of the controller are connected to a dedicated socket having seven jacks in total including six live line jacks and one zero line jack.

For the AC permanent magnet motor 1, the rotor 3 of the AC permanent magnet motor 1 is separated from the surface of a stator permanent magnet 6 by an air gap 5. When the AC permanent magnet motor 1 is in a static state, a rotary disc can freely rotate around a main shaft. When the stator coil 11 is electrified, the intensity of an electromagnetic field generated on the surface of a pole head of the stator core 4 is not greater than data of a magnetic coercive force of the stator permanent magnet 6. The rotor core 36 is provided with a squirrel cage 12 structure made of copper or aluminum. A groove 10 is provided on the rotor core 36 in a gap between squirrel-cage bars. A recessed rotor permanent magnet 13 is mounted in the groove 10. The squirrel cage 12 bars have inclination angles, and the inclination ranges from a half of a groove to two grooves. A ratio of stator grooves to rotor grooves is designed according to common AC motors. Enclosed squirrel-cage 12 bars on the rotor 3 generate a torque by cutting rotating magnetic lines, to drive the rotor 3 to rotate toward one direction. At the same time, the rotor permanent magnets 13 on the rotor 3 are also affected by function of the compound magnetic field of the stator, to drive the rotor 3 to rotate.

The AC permanent magnet motor 1 has a structure having an outer rotating hub and an inner stator or a structure having an outer fixed hub and an inner rotating pivot. Structural styles of inner casings and housings of the rotor 3 and the stator 2 are designed and configured according to requirements of an associated device, so as to meet general requirements of the device. Electromagnetic phenomena and principles of converting mechanical energy into electric energy of the stator and the rotor in the two types of motors are basically the same, and many generic technologies exist. For the AC permanent magnet motor 1 whose stator is inside the outer rotating hub, different types of motors are formed when different parts are configured to be connected to the outer rotating hub 25. For example, if a tire is disposed on the outer rotating hub 25, the AC permanent magnet motor 1 is an AC permanent magnet motor 1 for a hub of a vehicle. If a gear or a belt pulley is disposed on the outer rotating hub 25, the AC permanent magnet motor 1 is an AC permanent magnet motor 1 directly providing a driving force to a mechanical device. If an output shaft, a support, and a protective cover of the motor housing 7 are disposed on the outer rotating hub 25, the AC permanent magnet motor 1 is a rotary shaft output-type AC permanent magnet motor 1 applicable to common machines and tools. A hollow shaft 17 is used to run connection lines 15 of the stator coils 11 through the hollow shaft 17. Because the rotational inertia is proportional to a square of a radius of the shaft, the rotational inertia of the AC permanent magnet motor 1 having the outer rotating hub 25 is greater than that of the AC permanent magnet motor 1 having the inner pivot. As the intensity of an inherent constant magnetic field of a combination of the stator permanent magnets 6 is higher, electric energy consumption of the stator coils 11 needs to be higher. Correspondingly, more converted mechanical energy is output, and consumption during the conversion would also be increased. The AC permanent magnet motor 1 starts operation when the power source is turned on, and stops the operation when the power source is turned off. Concentric accuracy of the stator 2 and the rotor 3 needs to be ensured during the machining, and dynamic balancing needs to be performed on the rotor 3, to reduce vibration and noise.

The foregoing descriptions are merely preferred embodiments of the present invention, but do not limit the implementation scope of this application, that is, equivalent variations and modifications that are made according to the scope of this application shall still fall within the scope of the present invention.

What is claimed is:

1. An alternating current (AC) permanent magnet motor, wherein the AC permanent magnet motor comprises a stator and a rotor, a power source suppled to the AC permanent magnet motor is input by an external controller; each of silicon steel cores of the stator is provided with some cable troughs and some coil windings, the stator core is provided with grooves, stator permanent magnets are mounted in the grooves, silicon steel sheet grooves comprise enclosed grooves and open grooves, and the two types of grooves are laminated with each other to form a stator core in a fence shape; a coil unit of the stator comprises at least two of the adjacent same stator cores, the stator permanent magnets in the grooves, and four same coils inserted into the cable troughs, and some same coil units form a three-phase stator coil; the rotor comprises a rotor core, a closed squirrel cage on the core, and a rotor permanent magnet in a core groove; and the controller outputs the power source on which three-phase fully-controlled rectification is performed and that has same positive and negative half sine-waves or step-wave pulses, to connect to 7 lead line ends of the three-phase stator coil by using a dedicated plug and socket;

wherein connectors of some lead lines of windings of stator coils in the AC permanent magnet motor are connected to a dedicated plug having a total of seven pins comprising six live line pins and one zero line pin in advance according to design requirements, when the AC permanent magnet motor is used, the dedicated plug is inserted into a dedicated socket associated with the dedicated plug, the number and sectional shapes and dimensions of the metal pins of the dedicated plug are the same as those of jacks of the dedicated socket, and DC power output lines of the controller are connected to the dedicated socket having a total of seven jacks comprising six live line jacks and one zero line jack.

2. The AC permanent magnet motor according to claim 1, wherein grooves formed by machining a single silicon steel sheet of the stator core has two shapes separately, one type is an open groove, and the other type is an enclosed groove, a surface of the core after the two types of different grooves are alternately laminated is in a fence shape, so that permanent magnets mounted inside the grooves are alternately exposed from obvious gaps, and the area of the exposed part is greater than or equal to one half of the area of the surface of the core; some same permanent magnets having same polarities are mounted inside the grooves, permanent magnets mounted inside adjacent coils have opposite polarities, aluminum plates are mounted on side surfaces of the permanent magnets mounted in the silicon steel grooves to isolate magnetic fields, the permanent magnets are packed with a graphite film material having high thermal conductivity for heat dissipation, and a number of the cable troughs on the stator core is 6, 12, 24, 48, or N times 2 by analogy; the adjacent coils are respectively electrified with currents having opposite directions, so that generated electromagnetic fields also have opposite polarities; polarities of the permanent magnets mounted in the adjacent coils are the same as those of the electromagnetic fields of the coils respectively, each phase coil is formed by combining some groups of two same coil units respectively electrified by a forward current or a reverse current, every three phase coils comprising some same coil units form a three-phase, A, B, and C, coil, and two same three-phase coils form a stator three-phase coil wherein A+, B+, C+, A−, B−, C− and O lines are combined in a positive-negative correspondence manner, and some integer multiples of the same three-phase coils form a complete stator coil; and an effective magnetic length L of the stator core comprises a whole segment or some same segments.

3. The AC permanent magnet motor according to claim 1, wherein a connection method of the stator coil is that: one single-phase power source is supplied to one group of coil units, the coil unit comprises an integer multiple of at least two adjacent same silicon steel cores and permanent magnets in grooves, a two-layer or multi-layer coil is inserted in each cable trough, and the coil unit comprises three same cable troughs and four same coils, wherein one sides of two of the four coils are jointly inserted in the cable trough between the two cores, forming a two-layer winding in the cable trough, the other two coils are respectively inserted in the other two cable trough adjacent to the two cores, forming one layer of winding in the other two cable troughs, the other layer of winding is formed by inserting a corresponding coil of another coil unit that is immediately adjacent to the coil unit, forming two-layer windings in the other two cable troughs, and by analogy, a winding inserting process for a whole stator coil is completed; each phase coil comprises some paired coil units, an N-pole electromagnetic field generated on a surface, electrified by a forward current, of one coil of each coil units, together with a magnetic field of an N-pole permanent magnet mounted inside a groove, forms a new compound N-pole magnetic field, and an S-pole electromagnetic field generated on a surface, electrified by a reverse current, of the other coil, together with a magnetic field of an S-pole permanent magnet mounted inside a groove, forms a new compound S-pole magnetic field; single-phase currents, different from each other by a $\pi$ period, of the two groups of paired coil units simultaneously electrified comprehensively form a complete single-phase sine wave or step wave form on the coil units; when magnetic motive forces of three single-phase power sources are added up, a comprehensively formed single-phase sine-wave or step-wave current is mutually supplied as a three-phase current having a 120-degree potential angle, a three-phase sine-wave current or a complete step-wave is formed;

and some same coil units form a three-phase stator coil to generate a rotating magnetic field.

4. The AC permanent magnet motor according to claim 1, wherein the stator three-phase coils have completely identical parameters, a Y star-shaped connection manner is used, and lead lines are an integer multiple of three phase lines and one zero line; there are seven lead lines in total, that is, two groups of A, B and C phase lines and one zero line; the stator coil comprises two groups of same three-phase AC coils; A, B and C phase lines of the two groups of coils are respectively electrified by a forward current and a reverse current; waveforms of the currents are respectively positive and negative half-waveforms of a same sine-wave or step-wave pulse; the waveforms of the currents of the coils are different from each other by $\pi$ period, potential angles of the three phase lines A, B, and C are different from each other by 120 degrees, and a frequency is between 20 Hz and 500 Hz, to facilitate speed regulation; and lead line ends cannot be exchanged individually.

5. The AC permanent magnet motor according to claim 1, wherein an enclosed squirrel cage structure made of copper or aluminum is disposed on a silicon steel laminated sheet of the rotor core, grooves are provided on the silicon steel laminated sheet of the rotor core between gaps of squirrel cage bars, recessed permanent magnets are mounted in the grooves, squirrel cage bars and the groove have inclination angles, the inclination of the squirrel cage bars ranges from one half of the groove to two grooves, a ratio of the number of stator grooves to the number of rotor grooves is designed according to common motors, the enclosed squirrel cage on the rotor generates a torque by cutting rotating magnetic force lines to drive the rotor to rotate toward a direction, permanent magnets on the rotor are also affected by a compound magnetic field of the stator to drive the whole rotor to rotate, and fan blades connected to the squirrel cage exist on the rotor.

6. The AC permanent magnet motor according to claim 1, wherein the external controller thereof mainly comprises an inverter and a three-phase fully-controlled rectifier, and comprehensively comprises accessory circuits for frequency translation and modulation, voltage stabilization and current stabilization, and a switch, and some sockets for connecting to an intelligent control circuit regulator are mounted on the controller; and a power source supplied to the AC permanent magnet motor is input by the controller, a power source supplied to the controller includes multiple types of power sources such as a municipal three-phase power source, a DC power source of a storage battery pack, or a solar cell, wherein when a DC power source is input, the power source needs to flow through the inverter, and then a three-phase AC power source having a sine wave or a step wave is supplied to the controller, and the controller performs rectification, frequency translation and modulation, and voltage stabilization and current stabilization, and supplies sine-wave or step-wave pulse DC power sources respectively having a same upper half-waveform and a same lower half-waveform to same coils of a three-phase stator of the AC permanent magnet motor and other accessory devices requiring electricity within a system.

* * * * *